United States Patent
Olsson et al.

(10) Patent No.: US 11,558,537 B1
(45) Date of Patent: Jan. 17, 2023

(54) VIDEO INSPECTION SYSTEM WITH WIRELESS ENABLED CABLE STORAGE DRUM

(71) Applicant: SeeScan, Inc., San Diego, CA (US)

(72) Inventors: Mark S. Olsson, La Jolla, CA (US); Michael J. Martin, San Diego, CA (US); Paul G. Stuart, Spokane, WA (US); Phillip Castaneda, El Cajon, CA (US); Tran Nguyen, San Diego, CA (US); Fred K. Ollinger, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 16/588,834

(22) Filed: Sep. 30, 2019

Related U.S. Application Data

(63) Continuation of application No. 13/826,112, filed on Mar. 14, 2013, now abandoned.

(Continued)

(51) Int. Cl.
*G01N 21/954* (2006.01)
*H04N 5/232* (2006.01)
(Continued)

(52) U.S. Cl.
CPC ........... *H04N 5/232* (2013.01); *G01N 21/954* (2013.01); *H04N 7/183* (2013.01); *H04N 2005/2255* (2013.01)

(58) Field of Classification Search
CPC ..... A61B 1/0016; A61B 1/042; A61B 1/0052; A61B 1/00009; A61B 1/00016;
(Continued)

(56) References Cited

U.S. PATENT DOCUMENTS 4,790,624 A * 12/1988 Van Hoye ................ B25J 18/06
    385/118
4,989,582 A * 2/1991 Sakiyama .......... H04N 5/23227
    600/109

(Continued)

FOREIGN PATENT DOCUMENTS

EP         2192538 A2    6/2010

OTHER PUBLICATIONS

International Searching Authority, "Written Opinion of the International Searching Authority" for PCT Patent Application No. PCT/US2014/030600, dated Sep. 15, 2015, European Patent Office, Munich.

*Primary Examiner* — William C Vaughn, Jr.
*Assistant Examiner* — Naod W Belai
(74) *Attorney, Agent, or Firm* — Steven C. Tietsworth, Esq.; Michael J. Pennington, Esq.

(57) ABSTRACT

Among other things, techniques, systems, methods and computer readable storage medium with executable instructions relating to the viewing of data from and the controlling of the operation of an inspection camera at a remote computing device that is connected to the inspection camera via a network are described. Various features may be realized by using an installable software application or a web browser at the remote computing device. Features of the invention also pertain to a smart cable storage drum comprising a push cable, an inspection camera, and a network transceiver configured to communicate with a remote computer.

8 Claims, 10 Drawing Sheets

Related U.S. Application Data

(60) Provisional application No. 61/654,713, filed on Jun. 1, 2012.

(51) Int. Cl.
*H04N 7/18* (2006.01)
*H04N 5/225* (2006.01)

(58) Field of Classification Search
CPC .......... H04N 2005/2255; H04N 7/183; H04N 7/185; H04N 5/232; H04N 5/23203; H04N 5/2257; G01N 21/954; B65H 75/4465; B65H 75/00; B65H 75/364; B65H 2402/412; G01D 11/30; G03B 37/005; F16L 2101/30
See application file for complete search history.

(56) References Cited

U.S. PATENT DOCUMENTS

| | | | | |
|---|---|---|---|---|
| 5,090,259 A * | 2/1992 | Shishido | ............. | G01N 21/954 324/220 |
| 5,531,664 A * | 7/1996 | Adachi | ............. | A61B 1/0058 600/149 |
| 5,681,131 A * | 10/1997 | Goldenberg | ............. | F16L 55/26 242/118.1 |
| 6,371,907 B1 * | 4/2002 | Hasegawa | ............. | G02B 23/2476 600/102 |
| 6,540,670 B1 * | 4/2003 | Hirata | ............. | A61B 1/0051 600/146 |
| 6,545,704 B1 | 4/2003 | Olsson et al. | | |
| 6,846,285 B2 * | 1/2005 | Hasegawa | ............. | A61B 1/0052 600/102 |
| 6,958,767 B2 * | 10/2005 | Olsson | ............. | H04N 7/185 348/82 |
| 7,025,333 B1 * | 4/2006 | Gianturco | ............. | H02G 11/02 254/134.3 FT |
| 7,104,951 B2 * | 9/2006 | Hasegawa | ............. | A61B 1/0052 600/102 |
| 8,014,529 B2 * | 9/2011 | Koren | ............. | H04L 67/34 380/280 |
| 8,395,661 B1 * | 3/2013 | Olsson | ............. | H04N 5/2253 348/86 |
| 8,514,278 B2 * | 8/2013 | Karpen | ............. | A61B 1/00036 348/69 |
| 8,547,428 B1 * | 10/2013 | Olsson | ............. | G06T 7/0004 348/84 |
| 8,558,882 B1 * | 10/2013 | Kotab | ............. | H04N 7/18 348/82 |
| 9,706,907 B2 * | 7/2017 | Gumbs | ............. | A61B 1/0052 |
| 10,585,012 B1 * | 3/2020 | Olsson | ............. | G01M 3/005 |
| 2002/0022765 A1 * | 2/2002 | Belson | ............. | A61B 5/065 600/146 |
| 2002/0026096 A1 * | 2/2002 | Motoki | ............. | A61B 1/0016 600/146 |
| 2002/0165432 A1 * | 11/2002 | Matsui | ............. | A61B 1/0016 600/145 |
| 2003/0142207 A1 * | 7/2003 | Olsson | ............. | H04N 7/185 348/84 |
| 2004/0004113 A1 * | 1/2004 | Blankenship | .... | G06K 19/07749 235/375 |
| 2004/0070535 A1 * | 4/2004 | Olsson | ............. | G06F 3/016 342/459 |
| 2004/0225185 A1 * | 11/2004 | Obata | ............. | A61B 1/00039 600/118 |
| 2005/0004433 A1 * | 1/2005 | Hirata | ............. | A61B 1/0055 600/152 |
| 2005/0064814 A1 * | 3/2005 | Matsuo | ............. | G06K 7/10237 455/41.1 |
| 2005/0275725 A1 * | 12/2005 | Olsson | ............. | G03B 37/005 348/207.99 |
| 2006/0044156 A1 * | 3/2006 | Adnan | ............. | E21B 47/13 340/854.9 |
| 2007/0297778 A1 * | 12/2007 | Lange | ............. | G03B 37/005 396/19 |
| 2008/0013909 A1 * | 1/2008 | Kostet | ............. | G02B 6/4457 385/135 |
| 2009/0037605 A1 * | 2/2009 | Li | ............. | H04N 1/00209 709/246 |
| 2009/0122149 A1 * | 5/2009 | Ishii | ............. | H04N 1/00514 348/222.1 |
| 2010/0059219 A1 * | 3/2010 | Roberts | ............. | E21B 47/002 166/250.01 |
| 2010/0125959 A1 * | 5/2010 | Sooy | ............. | G05B 19/042 15/104.33 |
| 2010/0141762 A1 * | 6/2010 | Siann | ............. | H04N 5/232411 348/143 |
| 2010/0208056 A1 * | 8/2010 | Olsson | ............. | H04N 7/185 348/84 |
| 2011/0007159 A1 * | 1/2011 | Camp | ............. | H04N 21/23 348/143 |
| 2011/0058052 A1 * | 3/2011 | Bolton | ............. | H04N 5/23216 348/211.99 |
| 2011/0090330 A1 * | 4/2011 | Luzi | ............. | A01K 91/08 348/81 |
| 2011/0093799 A1 * | 4/2011 | Hatambeiki | ..... | H04N 21/42224 715/763 |
| 2011/0108654 A1 * | 5/2011 | Babb | ............. | B65H 75/364 242/400 |
| 2011/0109437 A1 * | 5/2011 | Olsson | ............. | G01N 21/954 340/8.1 |
| 2011/0119716 A1 * | 5/2011 | Coleman, Sr. | ......... | H04N 7/181 725/62 |
| 2011/0157461 A1 * | 6/2011 | Tanaka | ............. | H04N 5/23203 348/373 |
| 2011/0317064 A1 * | 12/2011 | Watts | ............. | H04N 7/183 348/372 |
| 2012/0044354 A1 * | 2/2012 | Cheng | ............. | H04N 5/23203 348/159 |
| 2012/0147173 A1 * | 6/2012 | Lynch | ............. | G03B 37/005 348/84 |
| 2012/0162401 A1 * | 6/2012 | Melder | ............. | H04N 7/183 348/65 |
| 2012/0327225 A1 * | 12/2012 | Barley | ............. | H04N 7/188 348/143 |
| 2013/0278777 A1 * | 10/2013 | Sweet, III | ........... | G06F 16/9577 348/169 |
| 2013/0332706 A1 * | 12/2013 | Tanaka | ............. | G06F 13/385 712/220 |
| 2014/0139658 A1 * | 5/2014 | Dhanvantri | ........... | H04L 67/025 348/85 |
| 2014/0147086 A1 * | 5/2014 | Chapman | ............. | G02B 6/4463 385/101 |
| 2015/0009016 A1 * | 1/2015 | Dai | ............. | G06K 7/10237 340/10.1 |

* cited by examiner

VIDEO INSPECTION SYSTEM WITH WIRELESS ENABLED CABLE STORAGE DRUM

CROSS-REFERENCE TO RELATED APPLICATIONS

This application claims priority under 35 U.S.C. § 119(e) to U.S. Provisional Patent Application Ser. No. 61/654,713, Filed Jun. 1, 2012, entitled SYSTEMS AND METHODS INVOLVING A SMART CABLE STORAGE DRUM AND NETWORK NODE FOR TRANSMISSION OF DATA, the content of which is hereby incorporated by reference herein in its entirety for all purposes.

FIELD OF THE INVENTION

This disclosure relates generally to cable storage drums configured to store push-cables attached to inspection devices (e.g., cameras and other devices configured to collect information relating to particular environments). This disclosure further relates generally to control of inspection devices by one or more control devices using at least one software application and at least one wired or wireless communication pathway. Communication between inspection devices and control devices may be carried out using any suitable protocol, including Internet Protocol. In this manner, the software application may be web-enabled. More specifically, but not exclusively, this disclosure relates to devices and methods used in communicating video and/or other data between at least one inspection device and at least one remote computing device.

BACKGROUND OF THE INVENTION

Cable storage drums used to contain push-cables with inspection cameras are known in the art. Such cable storage drums may connect directly to a camera control unit that is configured to store and display video and other data captured by an inspection camera, and to control the inspection camera (e.g., configure data and video feed from the inspection camera, etc.). Such a camera control unit tends to be an expensive, complicated and bulky piece of equipment that requires specialized skill to operate. Moreover, use of such a camera control unit prevents collaborative control of inspection equipment and viewing of captured video/data at various locations of multiple users. Indeed, a user of a cable storage drum with an attached inspection camera must carry a bulky, unnecessarily complicated, and expensive camera control unit in order to perform an inspection of a pipe or other otherwise inaccessible conduit. The use of camera control units further limits participation by remote users during the inspection.

Accordingly, there is a need in the art to address the above-described as well as other problems.

SUMMARY OF THE INVENTION

The present disclosure relates generally to cable storage drums used to contain push-cables with inspection cameras for use in inspecting pipes or otherwise inaccessible conduits. A cable storage drum may include a drum casing, an attached push-cable, an inspection camera or other inspection device, and a network (e.g., local area network (LAN)) transceiver to communicate with a suitable computing device such as a smart phone, laptop, tablet computer or other mobile computing device. Such a computing device may allow a user to view inspection data captured by the inspection device and may permit the user to control the inspection device. Transmission of data and control commands may occur over a wireless or wired network connection (e.g., a wireless LAN).

The present invention may also or alternatively relate to a cable drum configured with means to record and store video and/or other data from an inspection camera, other inspection device, and/or computing device. The cable drum may include an embedded hard drive or other recording technology or may connect to an external hard drive, USB thumb drive, or other recording device/technology (e.g., cloud storage, storage at an external computing device and a fixed or removable battery.

The present invention may also or alternatively relate to a cable drum having an embedded network transceiver that enables exchange of information among various devices connected to the network (e.g., between an inspection device of the cable drum and a remote computing device using a wireless local area network hotspot). Hereafter the abbreviation WLAN may be used for the term "wireless local area network". Upon connecting to a WLAN hotspot, a web browser or other software application used by the computing device may present a webpage or other user interface that presents data from inspection device). By way of example, the webpage may display streaming video from an inspection camera, and may further provide a control interface configured to receive instructions from a user that are used to control the inspection camera. Similarly, a software application may be installed onto the computing device, and may be launched to connect the computing device to the cable storage drum's network.

In accordance with some aspects of the invention, the network may use any of various wireless communication technologies, including Bluetooth and/or the WLAN hotspot. The network transceiver may use a wired local area network connection such as, for instance, through an Ethernet or USB cable and connectors.

In accordance with yet other aspects of the invention, the computing device may be enabled to modify or otherwise use data captured by an inspection device. For instance, a user may edit a pipe inspection report by adding text, audio narration, drawings, highlights/circles or other markups to images and text in the report. The user may make such edits by way of menu selections on a user interface and/or manipulating objects on the computing devices screen (e.g., manipulating a cursor or other selection tool). One of skill in the art will appreciate that a user may edit data using features available only in conjunction with touchscreens. When coupled with a web service or internet connection, the computing device may transfer inspection data to remote locations (e.g., another computing device operated by a fellow inspector or a beneficiary of the inspection, cloud storage, or various other destinations).

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF THE INVENTION

Overview

Figure 1:
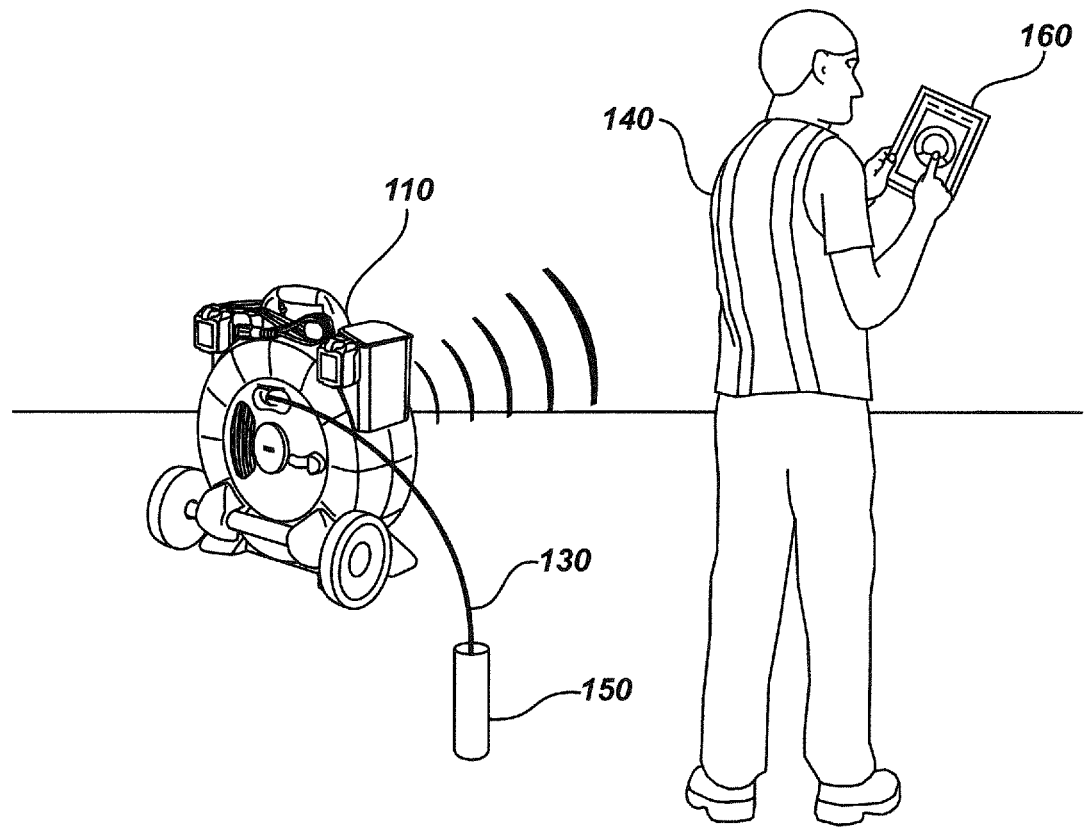
FIG. 1 depicts an illustration of user performing a pipe inspection using a smart cable storage drum and enabled computing device.
Figure 1:
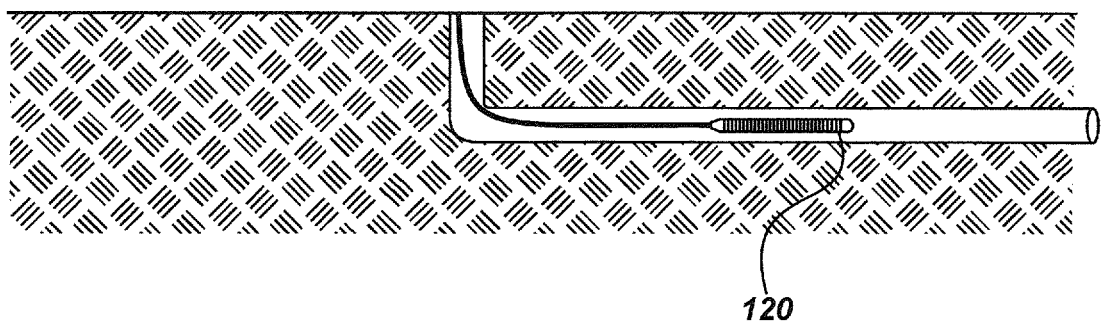

The present disclosure relates generally to cable storage drums used to contain push-cables with inspection cameras for use in inspecting pipes or otherwise hard-to-access conduits and areas.

The following disclosure of various embodiments of the invention is provided to illustrate different aspects, details, and functions of the present invention. It is to be understood that embodiments described herein are not intended to be in any way limiting. It will be apparent to one of ordinary skill in the art that various aspects may be implemented in other embodiments within the spirit and scope of the present disclosure.

For example, in accordance with one aspect of the invention, a cable storage drum may include any number of means, including hardware and/or software components, for recording and storing video and/or other information from an inspection device (e.g., camera) and/or one or more computing device(s). Such hardware and/or software may include a hard drive or other recording technology embedded in the cable storage drum, and/or an output (e.g., a USB port, wireless transceiving component, etc.), for connecting to external memory (e.g., a USB memory stick, external hard drive, cloud storage, or other external recording device).

Such hardware or software components may reside entirely within a rotating structure of a cable drum (e.g., a centrally-located rotary hub around which a push cable may be wound and unwound during storage or use). Alternatively, the hardware and software components may reside within non-rotating supporting structure. By way of another example, some of the hardware and software components may reside within the rotating structure while others may reside in the non-rotating fixed structure, where an electrical and data link may be formed using rotating contacts (e.g., via a slip ring). A power source (e.g., a battery) may reside within or attach to the rotating component. Where electronic components rotate with the rotating structure, no slip ring may be needed.

In accordance with another aspect, a local area network transceiver within the cable storage drum may provide a wireless local area network ("WLAN") hotspot to which external computing devices may connect. Upon connecting to the WLAN hotspot (or other suitable network node), one or more computing devices may open a web browser or other installable software application for displaying a webpage or other user interface that provides streaming video from the inspection camera, and/or provides a control interface that receives instructions from a user that control the inspection camera.

In accordance with yet another aspect, Bluetooth, Ethernet, USB cable or other wireless and wired communication technologies may be used in lieu of or in addition to the WLAN hotspot. Similarly, a wide area network (WAN) or other network may also or alternatively be used.

Still, in accordance with yet another aspect, the computing device may be enabled to modify or otherwise use data captured by an inspection device. For instance, a user may edit a pipe inspection report by adding text, audio narration, drawings, highlights/circles or other markups to images and text in the report. The user may make such edits by way of menu selections on a user interface and/or manipulating objects on the computing devices screen (e.g., manipulating a cursor or other selection tool). One of skill in the art will appreciate that a user may edit data using features available only in conjunction with touchscreens. When coupled with a web service or internet connection, the computing device may transfer inspection data to remote locations (e.g., another computing device operated by a fellow inspector or a beneficiary of the inspection, cloud storage, or various other destinations).

Various additional aspects, features, and functions are described below in conjunction with FIGS. 1 through 5 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Terminology

As used herein the term "hotspot" refers to any local area network node. This may include any local area network node establishing a wireless and/or wired connection utilizing a variety of different technologies between a smart cable storage drum and an enabled computing device. Some of these technologies may include but are not limited to WLAN (e.g., Wi-Fi), Bluetooth, Ethernet, and USB. One of skill in the art will appreciate that disclosure related to local area networks, and in particular WLAN hotspots, also applies to other networks (e.g., cloud networks, wide area networks, cellular networks, radio and other beacon networks, distributed networks, satellite networks, among other networks known in the art).

Furthermore, as used herein the term "LAN" may refer to any local area network both wired and wireless. The term "WLAN" as used herein may refer to a wireless local area network based upon IEEE 802.11 standards.

Aspects Relating to Buried Object Locating Systems

Turning to FIG. 1, a cable storage drum 110 may include an inspection camera 120 (or other inspection device)

attached to the end of a push cable 130. A user 140 may insert the push cable 130 and attached or integral inspection camera 120 into a pipe 150. A wireless local area network connection may be established between the cable storage drum 110 and a computing device 160 (e.g., a tablet) using a variety wireless technologies such as, but not limited to, WLAN and Bluetooth. The computing device 160 may then be used to view data from and control aspects of the inspection device 120. Various aspects and details regarding cable storage drums and push cables are described in co-assigned U.S. patent application Ser. No. 12/371,540, filed Feb. 13, 2009, entitled PUSH-CABLES FOR PIPE INSPECTION SYSTEM; U.S. patent application Ser. No. 13/073,919, filed Mar. 28, 2011, entitled PIPE INSPECTION SYSTEM WITH JETTER PUSH-CABLE; U.S. patent application Ser. No. 13/214,208, filed Aug. 21, 2011, entitled ASYMMETRIC DRAG FORCE BEARINGS FOR USE WITH PUSH-CABLE STORAGE DRUMS; U.S. patent application Ser. No. 12/704,808, filed Feb. 12, 2010, entitled PIPE INSPECTION SYSTEM WITH REPLACEABLE CABLE STORAGE DRUM; U.S. patent application Ser. No. 13/774,351, filed Feb. 22, 2013, entitled DOCKABLE TRIPODAL CAMERA CONTROL UNIT; U.S. Provisional Patent Application Ser. No. 61/671,644, filed Jul. 13, 2012, entitled SELF-GROUNDING TRANSMITTING PORTABLE CAMERA CONTROLLER FOR USE WITH PIPE INSPECTION SYSTEMS; U.S. Provisional Patent Application Ser. No. 61/174,429, filed Apr. 30, 2009, entitled LOG FILE FOR CAMERA INSPECTION SYSTEMS; U.S. patent application Ser. No. 12/939,591, filed Nov. 4, 2010, entitled SMART PERSONAL COMMUNICATION DEVICES AS USER INTERFACES; U.S. patent application Ser. No. 11/679,092, filed Feb. 26, 2007, entitled LIGHT WEIGHT SEWER CABLE; U.S. patent application Ser. No. 13/589,948, filed Ser. No. 13/589,948, entitled LIGHT WEIGHT SEWER CABLE; U.S. patent application Ser. No. 12/704,808, filed Feb. 12, 2010, entitled PIPE INSPECTION SYSTEM WITH REMOVABLE DRUM; U.S. patent application Ser. No. 13/346,668, filed Jan. 9, 2012, entitled PORTABLE CAMERA CONTROLLER PLATFORM FOR USE WITH PIPE INSPECTION SYSTEMS; U.S. patent application Ser. No. 13/676,018, filed Nov. 13, 2012, entitled PORTABLE PIPE INSPECTION SYSTEMS AND APPARATUS; U.S. patent application Ser. No. 13/754,767, filed Jan. 30, 2013, entitled ADJUSTABLE VARIABLE RESOLUTION INSPECTION SYSTEMS AND METHODS; U.S. Pat. Nos. 6,545,704; 5,939,679; 6,831,679; 6,958,767; and 6,862,945; 5,457,288; 5,808,239; 6,908,310; 8,395,661; 8,289,385; collectively referred to herein as the "related applications". The content of each of these patents, publications and applications is incorporated by reference herein in its entirety for all purposes.

Turning to FIGS. 2A, 2B, 2C, 2D and 2E, the cable storage drum 110 is shown in detail according to different embodiments depicting various aspects. The cable storage drum 110 may comprise a front shell half 210 and a back shell half 220. A handle, such as the handle 230, may be included about the top of the cable storage drum 110 or at any other location. A wired connector 240 may optionally be included to connect a computing device in accordance with various aspects and features disclosed herein. For example, the wired connector 240 may permit a computing device to connect to a LAN connection hosted by the cable storage drum 110, or may alternatively permit the cable storage drum 110 to connect to a LAN hosted by the computing device. The wired connector 240 may also permit connection of a traditional camera control unit (not shown) to the cable storage drum 110. Various aspects and details regarding camera control units as used with pipe inspection systems are described in co-assigned patent applications, including, for example, U.S. Patent Application Ser. No. 61/607,510, entitled DUAL SENSED LOCATING SYSTEMS & METHODS, filed Mar. 6, 2012; U.S. Patent Application Ser. No. 61/430,932, entitled PORTABLE CAMERA CONTROLLER PLATFORM FOR USE WITH PIPE INSPECTION SYSTEM, filed on Jan. 7, 2011; U.S. Patent Application Ser. No. 61/602,065, entitled DOCKABLE TRIPODAL CAMERA CONTROL UNIT, filed on Feb. 22, 2012; U.S. patent application Ser. No. 13/774,351, filed Feb. 22, 2013, entitled DOCKABLE TRIPODAL CAMERA CONTROL UNIT; U.S. Provisional Patent Application Ser. No. 61/671,644, filed Jul. 13, 2012, entitled SELF-GROUNDING TRANSMITTING PORTABLE CAMERA CONTROLLER FOR USE WITH PIPE INSPECTION SYSTEMS; U.S. Provisional Patent Application Ser. No. 61/174,429, filed Apr. 30, 2009, entitled LOG FILE FOR CAMERA INSPECTION SYSTEMS; U.S. patent application Ser. No. 12/939,591, filed Nov. 4, 2010, entitled SMART PERSONAL COMMUNICATION DEVICES AS USER INTERFACES; U.S. patent application Ser. No. 11/679,092, filed Feb. 26, 2007, entitled LIGHT WEIGHT SEWER CABLE; U.S. patent application Ser. No. 13/589,948, filed Ser. No. 13/589,948, entitled LIGHT WEIGHT SEWER CABLE; U.S. patent application Ser. No. 12/704,808, filed Feb. 12, 2010, entitled PIPE INSPECTION SYSTEM WITH REMOVABLE DRUM; U.S. patent application Ser. No. 13/346,668, filed Jan. 9, 2012, entitled PORTABLE CAMERA CONTROLLER PLATFORM FOR USE WITH PIPE INSPECTION SYSTEMS; U.S. patent application Ser. No. 13/676,018, filed Nov. 13, 2012, entitled PORTABLE PIPE INSPECTION SYSTEMS AND APPARATUS; U.S. patent application Ser. No. 13/754,767, filed Jan. 30, 2013, entitled ADJUSTABLE VARIABLE RESOLUTION INSPECTION SYSTEMS AND METHODS; and U.S. Provisional Patent Application Ser. No. 61/152,662, entitled HIGH PERFORMANCE PIPE INSPECTION SYSTEM, filed Feb. 13, 2009, also collectively referred to herein as the "related applications". The content of each of these patents, publications and applications is incorporated by reference herein in its entirety for all purposes.

A wheel assembly 250 may be located at the bottom of the cable storage drum 110 to aid with ease of transport. A central hub plate 260 may be secured to the sides of the cable storage drum 210 that largely conceal some or all of the push cable 130 and the inspection camera 120 when in use or not in use. The push cable 130 may be wound around a rotating cable carrier or hub (not shown) that is disposed within the cable drum 110 behind the central hub plate 260.

One or more cable feed holes 270 may be formed through the central hub plate 260 that, when the cable storage drum 110 is in use, allow the push cable 130 and the inspection camera 120 to pass through. A camera stowage clip 275 may be formed on the surface of the central hub plate 260 such that an inspection camera may be stored under the camera stowage clip 275 when not in use.

The cable storage drum 110 may also include a wireless transceiver module 280 enabled to transmit and receive signal via WLAN, Bluetooth, or other wireless technology. In at least one embodiment, a wired transceiver module (e.g., in the alternative to the wired connector 240) may replace or be used in conjunction with the wireless transceiver module 280 to establish a wired local area network connection between one or more computing devices and a smart cable storage drum such as the cable storage drum 110. A USB port 285 or other suitable input/output port may also be included to permit additional data exchange.

One or more stow bins 290 may be included so that a connector for one or more batteries such as the batteries 295 may provide electrical power to the cable storage drum 110. A lid on top of the stow bins 290 may provide access to storage for tools, extra batteries, or other job-related items within the stow bins 290. The batteries 295 may be batteries such as those disclosed in U.S. Provisional Patent Application Ser. No. 61/521,262, entitled MODULAR BATTERY PACK APPARATUS, SYSTEMS, AND METHODS, filed Aug. 8, 2011, the contents of which is hereby incorporated by reference herein in its entirety. In some embodiments, different types of batteries and/or a wired connection to the electrical grid may be used to provide power to a smart cable storage drum such as the cable storage drum 110.

Figure 2A:
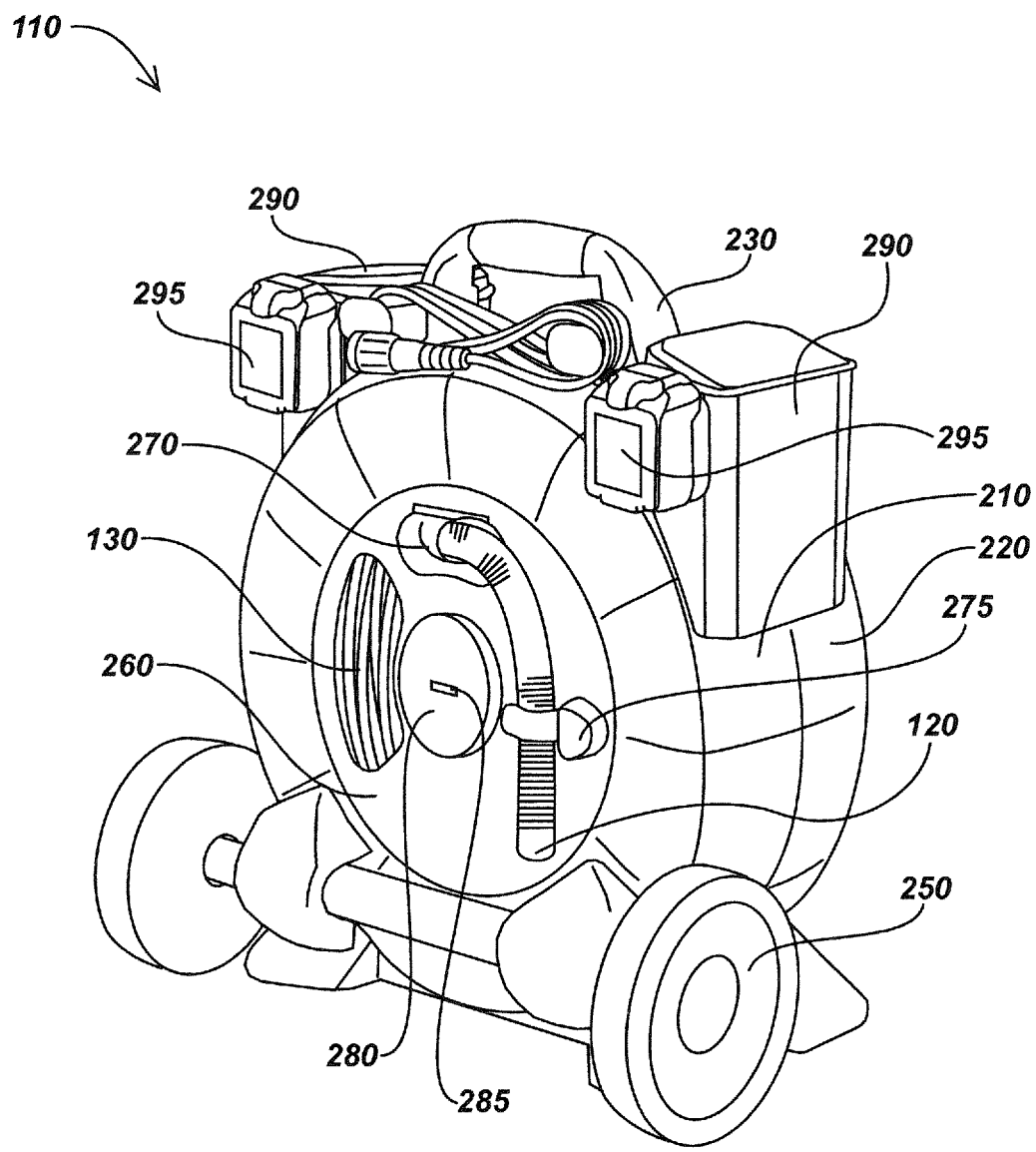
FIG. 2A provides an illustration of a smart cable storage drum depicting various aspects.
Figure 2B:
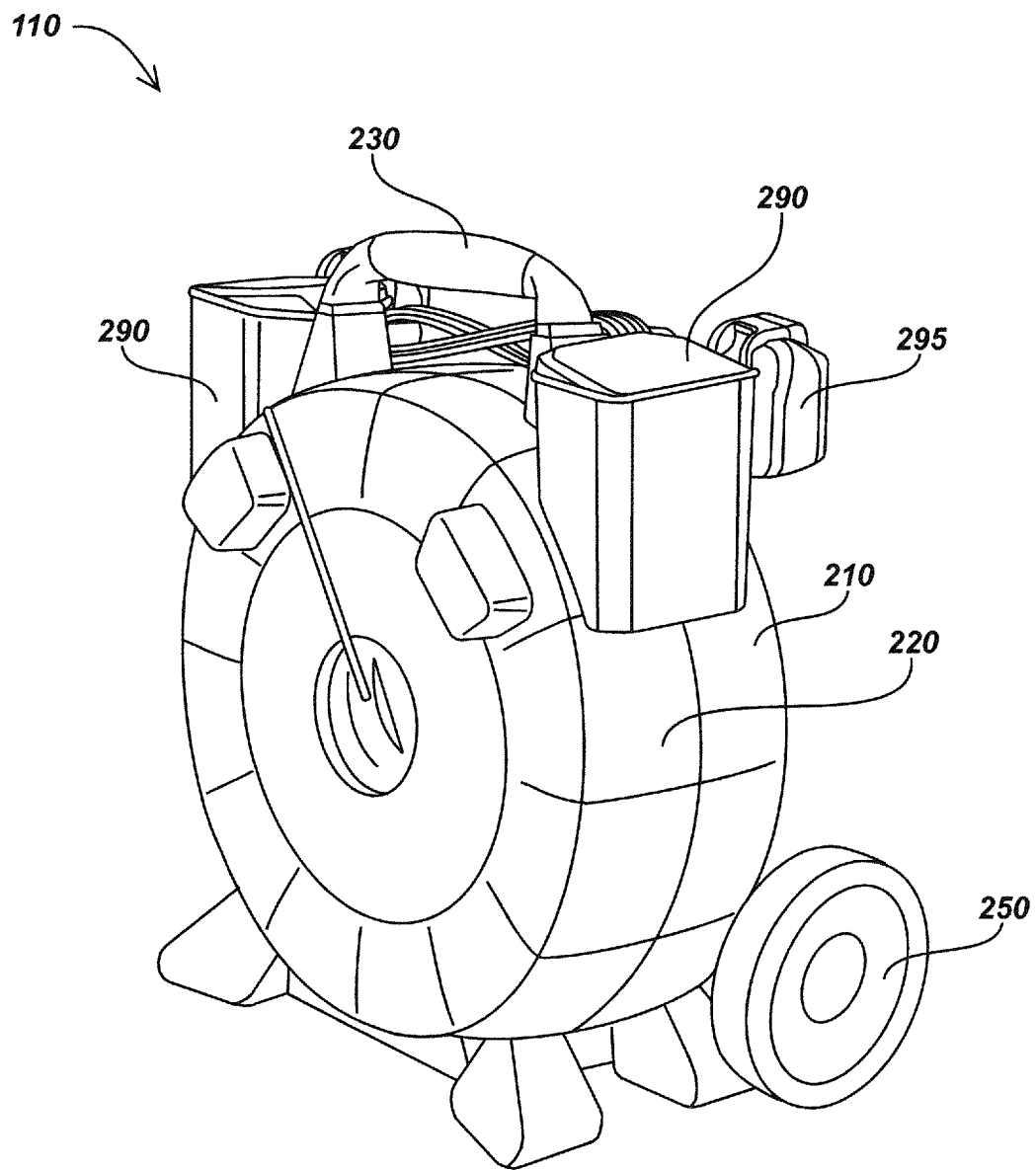
FIG. 2B provides an illustration of a smart cable storage drum depicting various aspects.
Figure 2C:
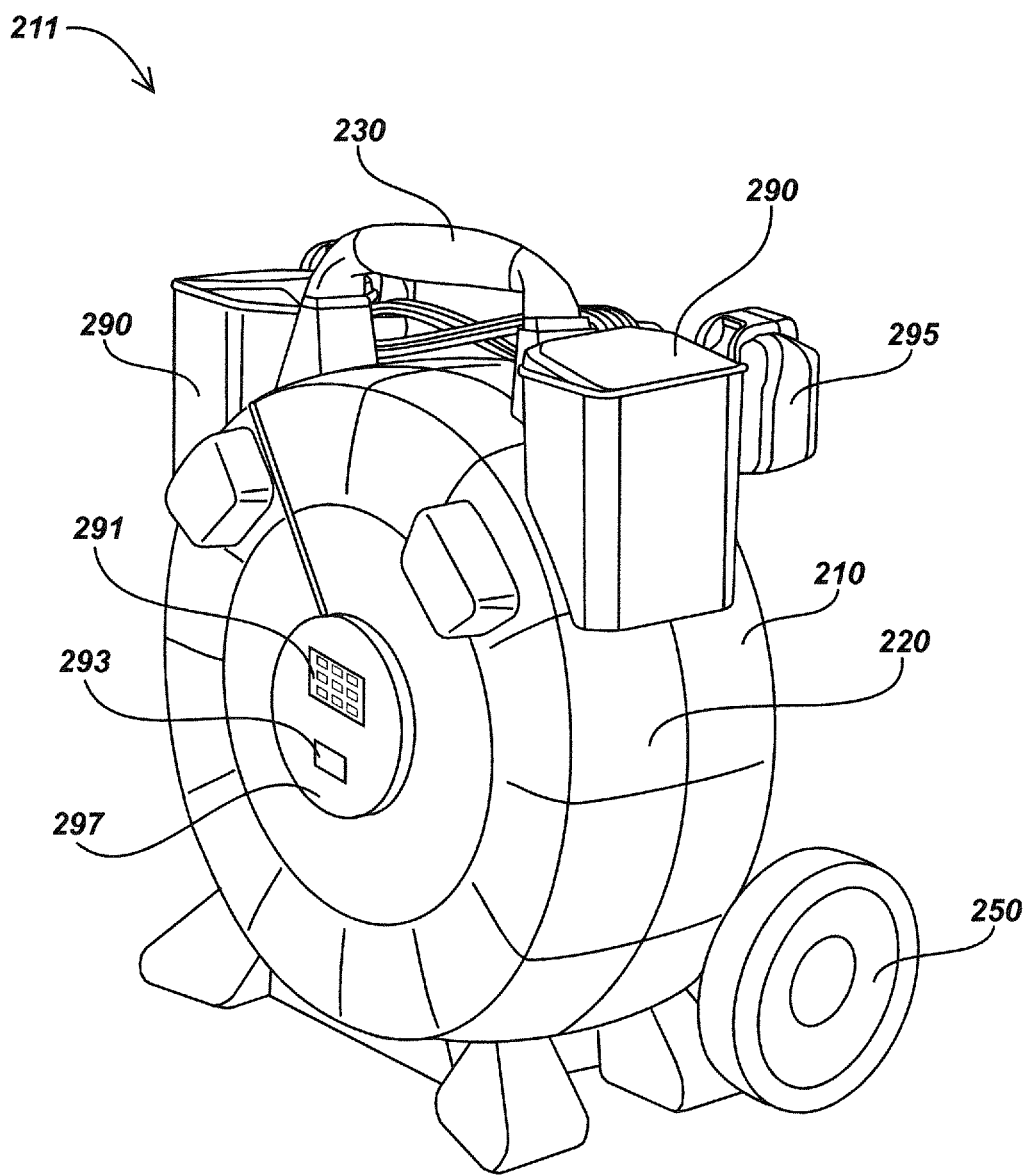
FIG. 2C provides an illustration of a smart cable storage drum depicting various aspects.

As shown in FIG. 2C, an alternative cable storage drum 211 may include a slip ring 297 that is integral with or inserted into a cavity 296 (shown in FIG. 2G) formed by at least part of the hub (e.g., a rotary hub 298 of FIG. 2F and FIG. 2G) around which the push cable winds and unwinds during storage and use. The slip ring 297 may be used to house various electronics and controls. For example, a small keypad 291 and USB or other communication port 293 may be integrated with the slip ring hub 297. The slip ring hub 297 may house a network transceiver (e.g., a WLAN transceiver), a compressor for compressing data from an inspection device, and other components, and may be detachable from the cable storage drum 211. As shown, the slip ring hub 297 may be coupled to the cable storage drum 211 along a central axis through a radial center of the cable storage drum 211 (e.g., the shell halves 210 and 210 of the cable storage drum 211).

Figure 2D:
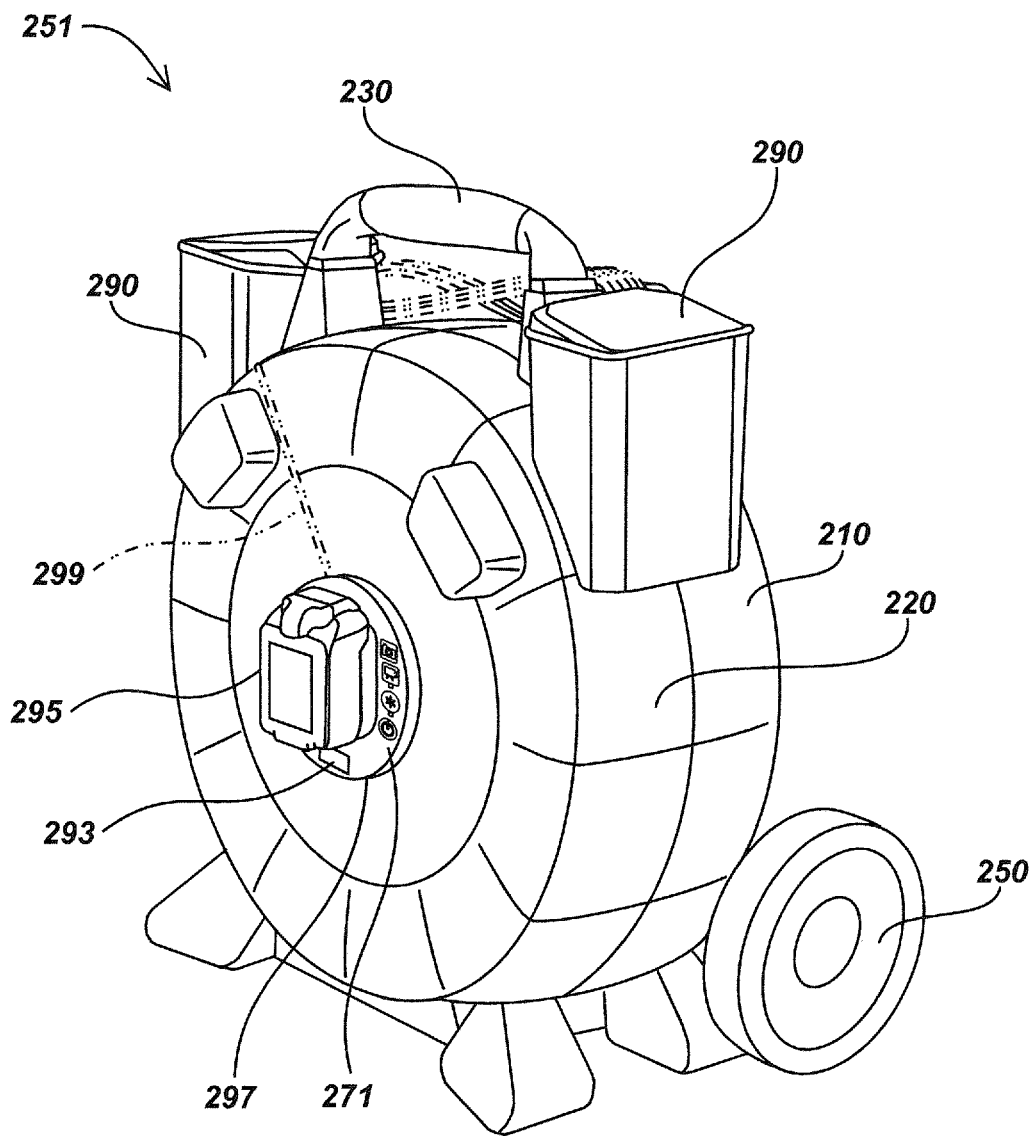
FIG. 2D provides an illustration of a smart cable storage drum depicting various aspects.

As shown in FIG. 2D, an alternative cable storage drum 251 may include a slip ring hub 297 or other hub that may be include or be otherwise coupled to various features, including a small keypad 271, a USB or other communication port 293, and a battery 295, among other electronic components like a network transceiver, and a compressor. Although not shown, the battery 295 may be configured so it is enclosed by the shell halves 210 and 210. As shown, the cable 299 is optional.

Figure 2E:
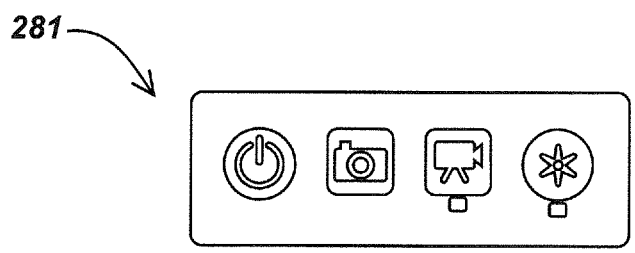
FIG. 2E depicts a key pad associated with a smart cable storage drum.

Greater detail of a key pad 281 is shown in FIG. 2E. The key pad 281 is similar to the keypad 271, and may include four buttons configured to (from left to right): activate power of hub 297 or the cable storage drum 251; activate an image capture feature where single photos are taken by an inspection camera; activate an image capture feature where video is taken by the inspection camera; and activate an auto-logging feature.

Figure 2F:
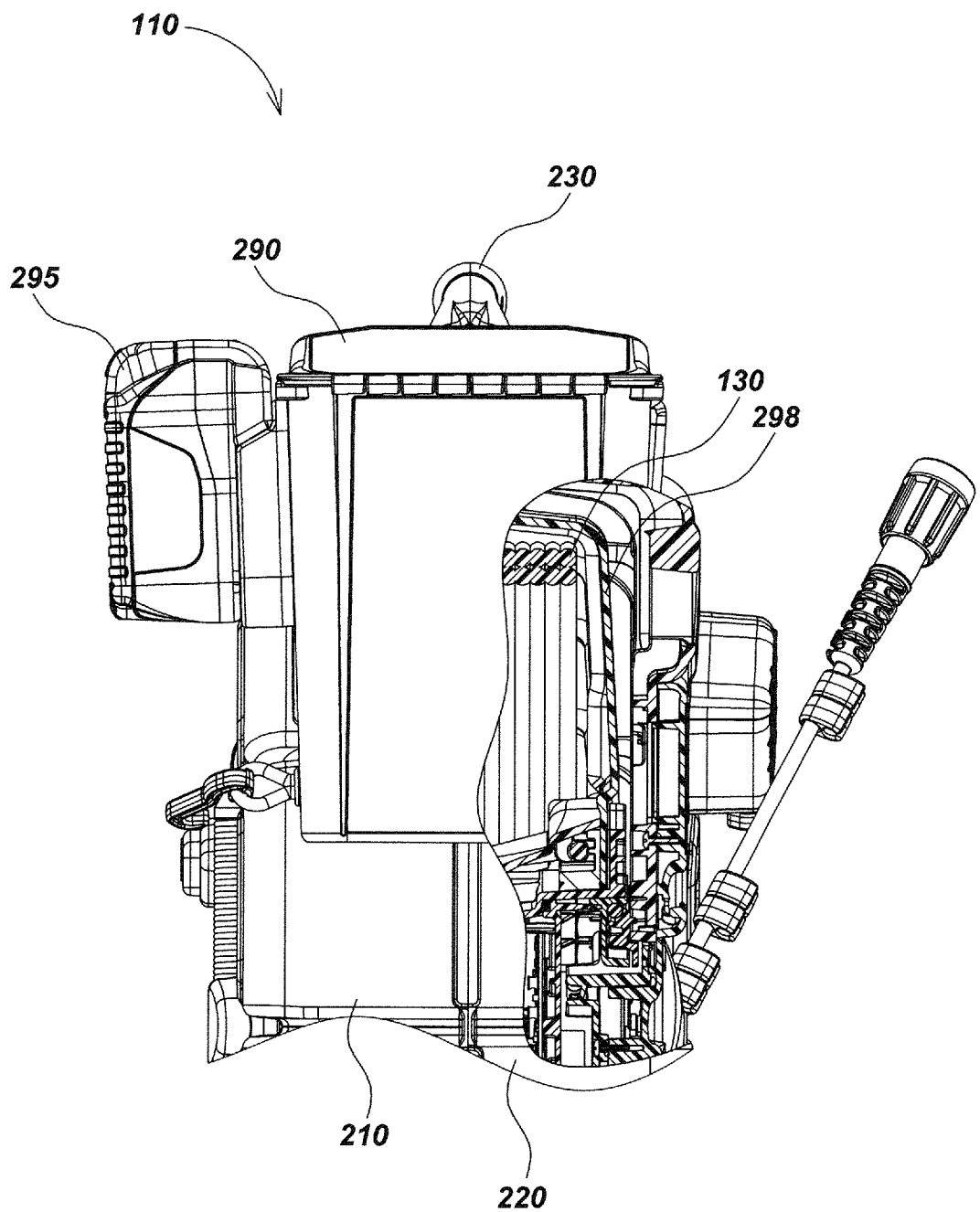
FIG. 2F provides an illustration of a smart cable storage drum depicting various aspects.
Figure 2G:
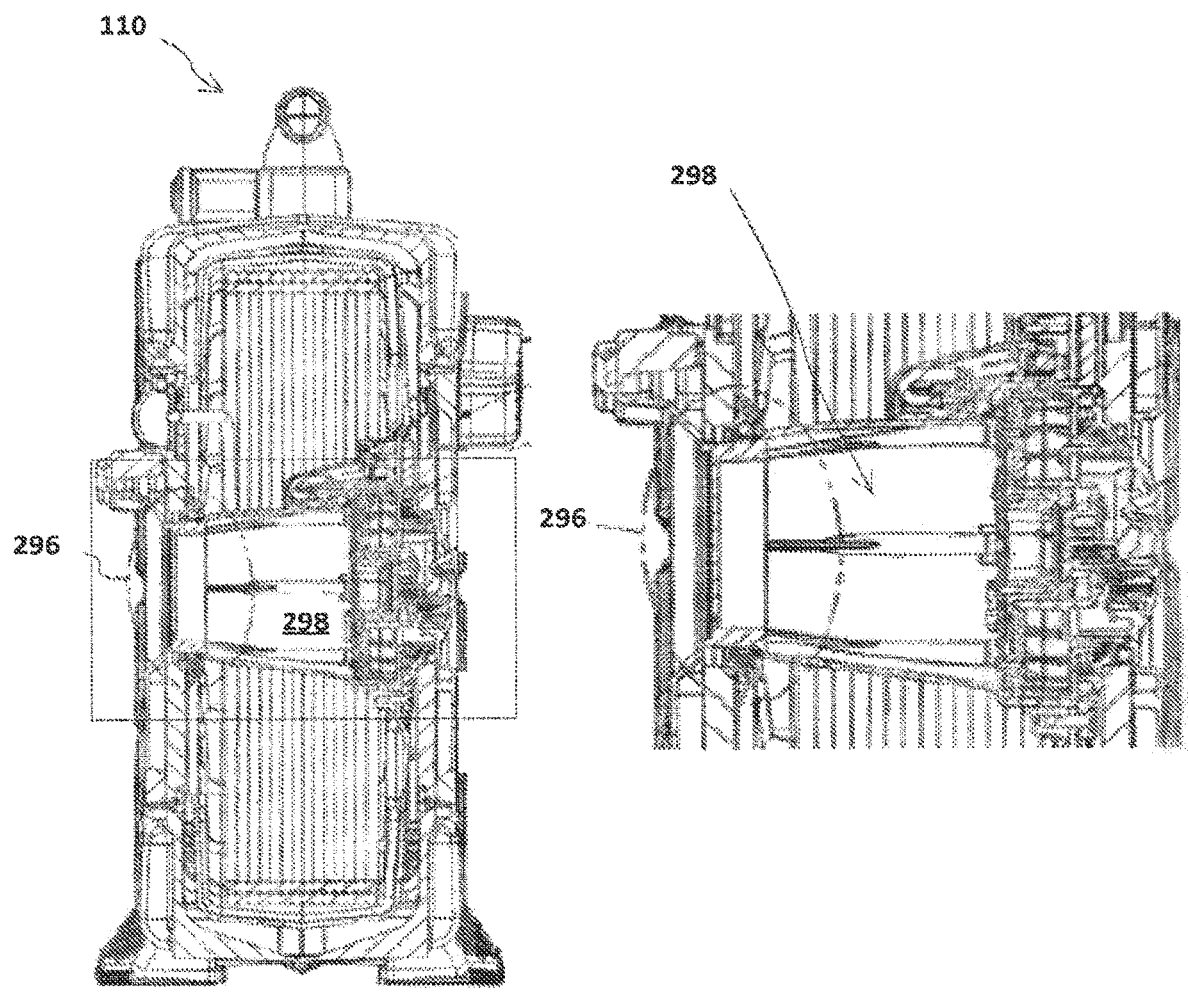
FIG. 2G provides an illustration of a smart cable storage drum depicting various aspects.

FIG. 2F shows one embodiment of rotary hub 298 configured to rotate when the push cable 130 is released from or received by the cable drum 110. FIG. 2G shows another embodiment of rotary hub 298 configured to rotate when the push cable 130 is released from or received by the cable drum 110. Various electronic components disclosed herein may be disposed on or integrated with the rotary hubs 298 of FIGS. 2F and 2G. Alternatively, a hub insert (e.g., a slip ring as described elsewhere herein) may house the electronics, and may electronically couple to an inspection device using rotating electrical contacts that transfer, among other things, power from a power source (e.g., battery or wired source) to/from the electronic components and may also transfer data or commands to/from the inspection device. Alternatively, data/command communication may take place via wireless communication pathways known in the art.

Figure 3:
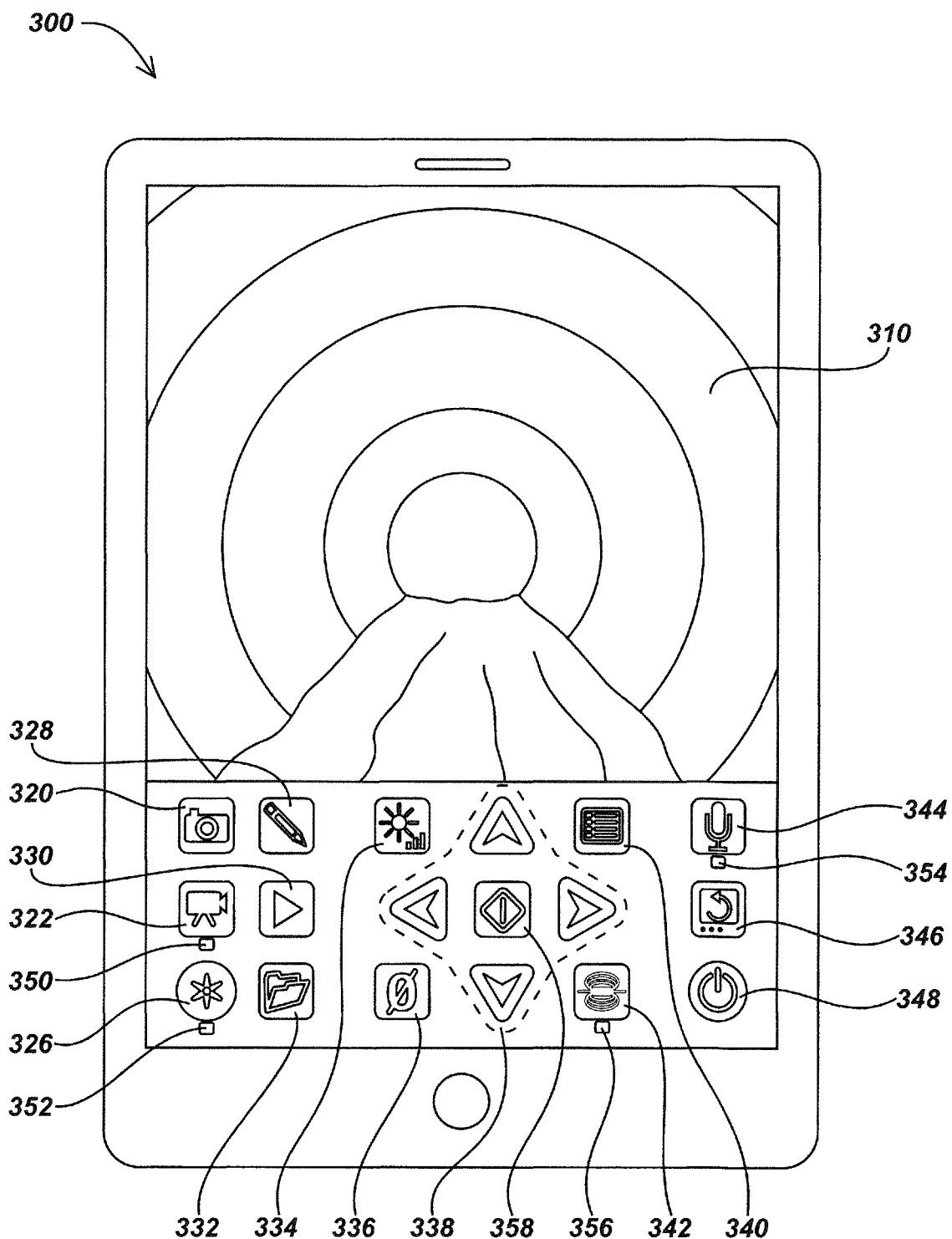
FIG. 3 depicts an illustration of a possible user interface for a computing device.

Attention is now drawn to FIG. 3, which depicts a control interface 300 for a computing device (e.g., computing device 160 from FIG. 1). As shown, the control interface 300 may include a viewing area 310 for viewing video and/or other data. The control interface 300 may also include various on-screen controls and menu options that are selectable by a user using a touchscreen input, mouse, keyboard or other means for selecting a presented control/menu option.

Examples of controls and menu options may include: a Photo Button 320 which, when selected, causes the inspection camera 120 to capture a snapshot of the present camera view; a Video Button 322 which, when selected, may start and stop video recording at the inspection camera 120; and an Auto-logging Button 326 which, when selected, may start and stop the capture of a series of timed still images from the inspection camera 120. Upon activation of the Auto-logging Button 326, and auto-log mode may be turned on at the drum 110, and audio inputted by the user may also be captured.

Furthermore, the control interface 300 may include: a Photo Tag Button 328, which may trigger the inspection camera 120 to capture a snapshot of the camera view and then open an editing screen area for enabling annotation of the photo with text and/or audio comments by a user; a Job Review Button 330, which may open a review screen area for reviewing captured video, snapshots, and/or audio elements, and/or for allowing notation to be added to video; and a Job Manager Button 332, which may open a menu that permits the user to generate a report, select an existing report file to view from a listing of existing files (e.g., stored locally or at an external database), and/or eject or otherwise disconnect a device from the cable storage drum 110 (e.g., a USB device from the USB port 295).

The control interface 300 may also include: a LED Brightness Button 334, which may provide for an adjustment of the level of illumination from LEDs on the inspection camera; and a Zero Button 336, which may allow a user to reset the zero-point of a cable distance counter on the smart cable storage drum or to cancel the use of a relative zero point.

A series of Arrow Buttons 338 may also be included and be used to traverse menus and screens shown on the display of the computing device 160. A Select Button 358 may be used to activate a selection in such a menu. Other controls include: a Menu Button 340, which provides configuration choices to a user; a Sonde Button 342, which may start and stop operation of a Sonde transmitter; a Microphone Button 344, which may activate audio recording for use in recording descriptive commentary; an Image Flip Button 346, which may be used to flip the vertical orientation of the screen image while mirroring the screen image horizontally for use when the camera has been rotated within a pipe; and a Power Button 348, which may be used to activate the inspection camera 120 and/or other inspection devices, for instance, from a sleeping state after a period of non-use.

Along with the various controls, a series of indicators may appear on-screen to notify a user of various parameters and statuses associated with the inspection camera 120 and/or other components of the cable storage drum 110. These indicators may include: a Video Indicator 350, which may be located under the Video Button 322, and may be used to indicate the state of video capture in progress or captured video under processing; an Auto-log Indicator 352, which may be located under the Auto-logging Button 326 which may be indicated by the use of an asterisk or star icon, and may be used to indicate that auto-logging is in progress; a Microphone Indicator 354, which may be located under the Microphone Button 344, and may be used to indicate when audio recording is in progress; and a Sonde Indicator 356, which may be located under the Sonde Button 342, and may be used to indicate the state of a Sonde when transmitting or not transmitting. Other functions and features may be incorporated into the user interface to permit control of other inspection devices.

In some embodiments, more than one recording modes may be used where the different modes may be more or less compressed than the data of the other modes. For instance, in auto-log mode, data may be more compressed than with a video recording mode. Data compression may be accomplished through any known or unknown methods in the art. In some embodiments, a cable storage drum in keeping with the present disclosure may be enabled to constantly record. In such embodiments with a constant recording mode, this mode may be activated by how the cable storage drum is turned on or through user settings or configuration.

One of skill in the art will appreciate various methods for receiving user control input, including user control inputs via voice-activation. Similarly, other kinds of switching devices may be used than those described herein while keeping within both the spirit and scope of the invention.

Figure 4:
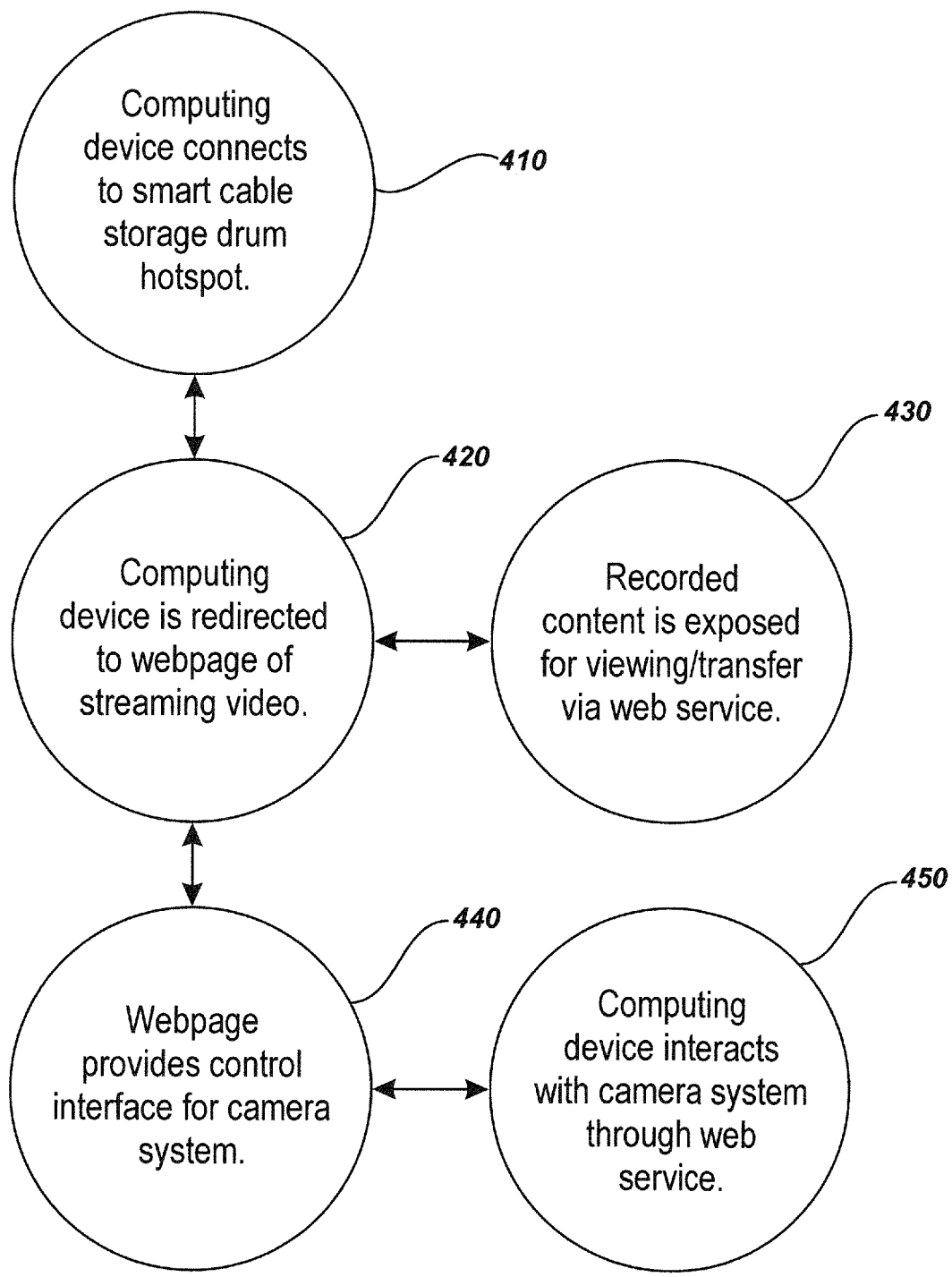
FIG. 4 is a flow chart describing a method for carrying out communication of data and instructions between a computing device and a smart cable storage drum.

Turning to FIG. 4, a flow chart is provided describing a method for using a computing device (e.g., the computing device 160 of FIG. 1) to view content from a smart cable storage drum, and to control certain aspects of the smart cable storage drum (e.g., the cable storage drum 110 of FIG. 1). At a first step 410, the computing device connects to a local area network associated with the cable storage drum (e.g., via a WLAN hotspot). At a second step 420, the computing device accesses and download a webpage configured to present information (e.g., video or other visual representation) captured by an inspection camera (e.g., the inspection camera 120 of FIG. 1) inside a pipe or other hard-to-access area. At a third step 430, any recorded content may be received from the inspection camera and made available for viewing via a suitable web service. At a fourth step 440, the webpage from step 420 may provide a control interface. Activation by a user of certain controls offered by the control interface may control certain operations of the inspection camera system or other inspection or measurement systems. At a fifth step 450, the computing device may interact with the inspection camera system through the web service.

Figure 5:
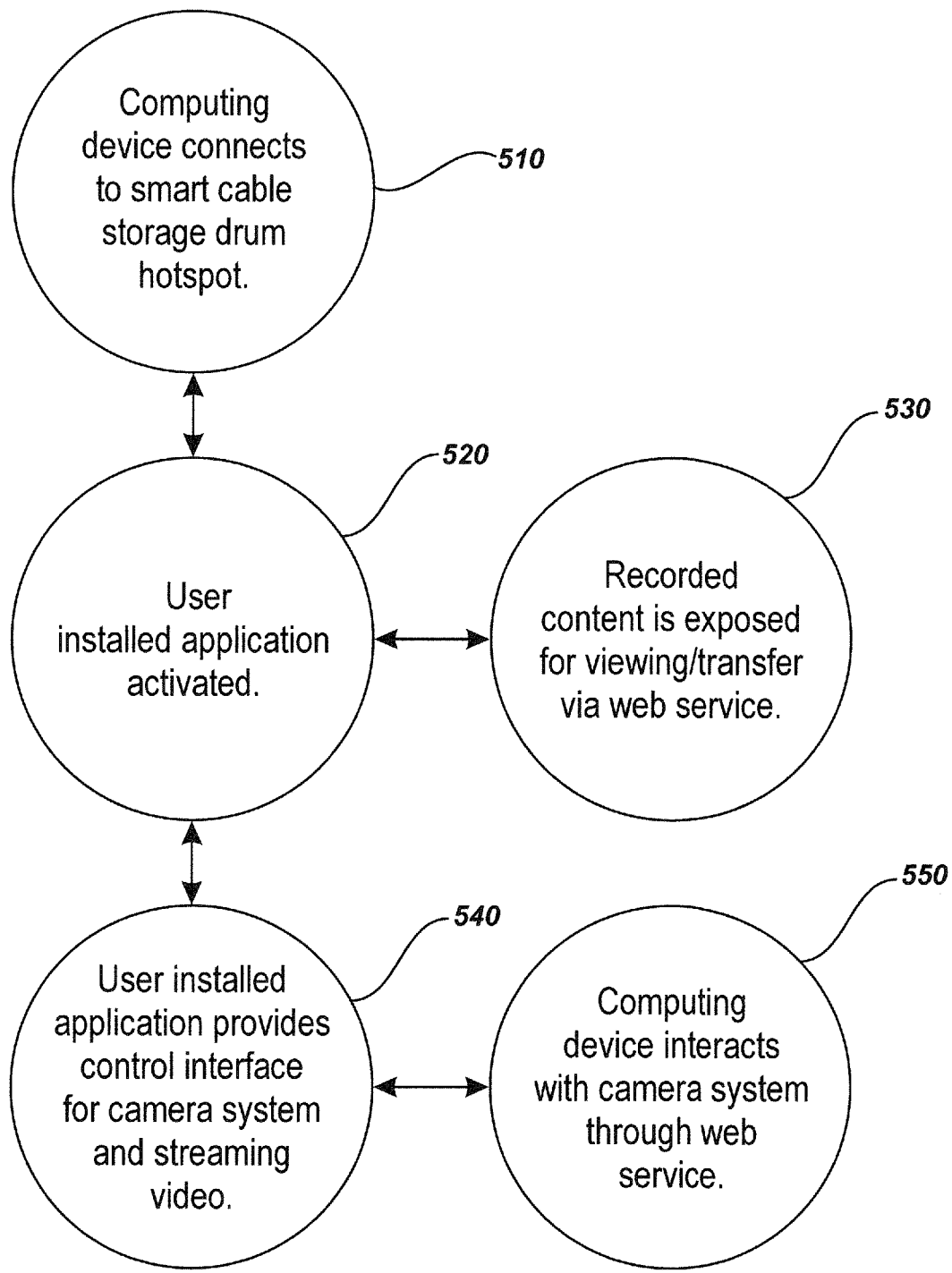
FIG. 5 is a flow chart describing yet another method for carrying out communication of data and instructions between a computing device and a smart cable storage drum.

Turning now to FIG. 5, a flow chart is provided describing a method for using a computing device (e.g., the computing device 160 of FIG. 1) to view content from a smart cable storage drum, and to control certain aspects of the smart cable storage drum (e.g., the cable storage drum 110 of FIG. 1). At a first step 510, the computing device connects to a local area network associated with the cable storage drum (e.g., via a WLAN hotspot). At a second step 520, the computing device activates an installable software application configured to present information (e.g., video or other visual representation) captured by an inspection camera (e.g., the inspection camera 120 of FIG. 1) inside a pipe or other hard-to-access area. At a third step 530, any recorded content may be received from the inspection camera (e.g., via a suitable web service or the network) and made available by the software application for viewing. At a fourth step 540, the software application from step 420 may provide a control interface. Activation by a user of certain controls offered by the control interface may control certain operations of the inspection camera system. At a fifth step 550, the computing device may interact with the inspection camera system through the web service or network.

FIGS. 4 and 5 illustrate flow charts describing two methods for enabling a computing device to view content from a smart cable storage drum, and to control certain aspects of a smart cable storage drum. One of skill in the art will appreciate various alternative methods for enabling such a computing device to view content from various resources in a system, including one or more inspection devices, other computing devices, and remote databases. Having access to content from various system resources enables a user of the computing device to enrich content received from an inspection device, correlate content from multiple resources, and better coordinate the efforts of one or more users in the system. Moreover, having access to content using one or more networks permits one or more users on the network(s) to view, manipulate, control the capture of, and manage the distribution of content from various locations and at various times.

For example, a computing device may access inspection data from a cable drum via a network (e.g., LAN, Internet, etc.). The computing device may also access related data from another system resource (e.g., another cable drum or inspection device, another computing device, or a backend database). Similarly, the cable drum may access the related data from the same resources. The computing device may then display the inspection data and/or the related data. A user at the computing device may also edit the displayed data and/or create data, and may distribute those edits and create data to the other resources in the system.

The user may also control, over the network, any of the networked resources. Similarly, other users may also control any of the networked resources.

Although at least some embodiments have been described as providing a hotspot or other suitable network node at the cable storage drum to which one or more external computers connect, it is contemplated that such a network node be provided (i.e., hosted) at one or more of the external computers, and that the cable storage drum (or inspection device) may connect to that node to carry out any number of the functions described herein.

Any discussion herein relating to video received from and control of an inspection camera is also applicable to data received from and control of other inspection devices, measurement devices, or other devices that collection information.

Other Aspects

One or more aspects may relate to systems and computer program products comprising a non-transitory computer usable medium having a computer readable program code embodied therein that may be configured to implement methods. By way of example, a system may include a smart cable storage drum comprising a push cable and an inspection camera configured to capture data relating to one or more images. The systems may include one or more wireless transceivers that may be coupled to the smart cable storage drum, and that may be configured to send and receive information to and from one or more remote computing devices and the smart cable storage drum. The system may further comprise any or all of: a slip-ring hub coupled to the smart cable storage drum that includes the one or more wireless transceivers, a key pad, electronics configured to compress the data, a USB port configured to connect to an external memory and transfer data to the external memory, and a battery configured to power the one or more wireless transceivers. The slip-ring hub may be detachably coupled to the smart cable storage drum along a central axis of the smart cable storage drum.

The system may cause a web browser or an installable software application to display a user interface (UI) on a computing device operated by a user, where the UI provides controls that may be selectable by the user to control one or more resources networked to the system. The one or more controls may include any or all of: an image control configured to cause the inspection camera to capture the data; a tag control configured to cause the computing device to display an editing interface that enables the user to annotate the data with one or more text, audio or highlighting annotations; a light brightness control configured to cause one or more lights of the inspection camera to adjust a level of illumination; a compression control configured to cause the data to be compressed, where the compression control may be displayed on the UI as an asterisk or star icon; a count reset control configured to reset a distance counter; an image flip control configured to cause the computing device to display a flipped version of an image captured by the inspection camera by mirroring the image about a horizontal axis when an orientation of the inspection camera has changed; a state control configured to cause the inspection camera to change its operation state; a sonde control configured to cause a sonde transmitter to activate or deactivate; and a job manager control configured to cause the computing device to display a menu that permits the user to generate a report.

The system may cause a web browser or an installable software application to display a user interface (UI) on a computing device operated by a user, where the UI provides one or more status indications. The one or more status indications may include any or all of: a sonde transmitter status indication configured to notify the user about whether the sonde transmitter may be transmitting or not transmitting, an image status indication configured to notify the user about whether the inspection camera may be capturing the data or whether the data may be undergoing processing; and a count status indication configured to display a current count number.

It may be contemplated that the above operations of the system may be controlled by computer program products.

A smart cable storage drum may also comprise any or all of: a push cable; an inspection camera configured to capture video; a means to record data and video; and a network transceiver configured to send and receive information to and from one or more remote computing devices using a network. The network transceiver may be a local area network transceiver, and the network may be a local area network.

The local area network transceiver may be a wireless local area network or WLAN utilizing IEEE 802.11 standards to communicate with computing devices. The local area network transceiver may be configured to send and receive information to and from one or more remote computing devices using Bluetooth technology. The local area network transceiver may be configured to send and receive information to and from one or more remote computing devices using wired technology.

In accordance with certain embodiments, it is understood that some mobile devices may boast both Wi-Fi connectivity and "network" or "data network" connectivity (e.g., such connectivity through a cellular carrier). In some cases, only one type of network connectivity may operate at a time. Put another way, the mobile device may not be capable of simultaneous transmissions on both Wi-Fi and data networks. As such, mobile devices may prefer one network over another (e.g., a Wi-Fi network so as not to exhaust a user's monthly data plan).

When a smart cable storage drum is enabled as a Wi-Fi access point, a neighboring mobile device that is connected to the Wi-Fi access point may maintain its connection without connecting to the "data" network (i.e., cellular or other network) to transfer data to or from a remote network (e.g., a server or data source). It is therefore advantageous to control the mobile device's connection from the Wi-Fi network connection to the data network connection, and similarly from data connectivity to the Wi-Fi connectivity. It is further advantageous to upload information to a remote location using the mobile device and its data connection as a conduit.

In order to permit a mobile device to send and receive information (e.g., emails, data to/from remote servers), the Bluetooth channel between the mobile device and the cable storage drum may be used as a wireless control channel to explicitly control when the mobile device has a connection to the Wi-Fi network and a connection to a data network. One approach would be to periodically, or on an event-driven basis, disable Wi-Fi connection offered by the cable storage drum so the mobile device defaults to its data network connection. This control may originate at the cable storage drum independent of the mobile device, or alternatively may be sent via the Bluetooth channel from the mobile device.

Alternatively, a command may be sent via the Bluetooth channel from the cable storage drum to disable the mobile's default connection to available Wi-Fi (i.e., disable the Wi-Fi connection at the mobile device as compared to the cable storage drum). Or, a status query may be sent via the Bluetooth channel from the cable storage drum to determine whether the Wi-Fi access point should be disabled, or whether the connection to that mobile device should be temporarily denied.

By way of example, one process flow relating to the Bluetooth channel control among a smart cable storage drum and a mobile device in a system may include the following steps: power smart cable storage drum; enable Wi-Fi hotspot/access point at the smart cable storage drum; connect mobile device to Wi Fi hotspot; transmit data/control between mobile device and smart cable storage drum; determine whether to disable the Wi-Fi connection between the mobile device and the smart cable storage drum based on user input (e.g., opening a computer application for transmitting data or selecting an option to transmit data between mobile device and remote device); disable the Wi-Fi connection using the Bluetooth channel (e.g., instruct smart cable storage drum to disable the Wi-Fi connection with respect to the mobile device); connect mobile device to data network to transmit data between the mobile phone and a remote device using the data network; determine whether to disable the connection between the mobile device and the data network, or alternatively enable the Wi-Fi connection between the mobile device and the smart cable storage drum based on user input or an event (e.g., closing a computer application for transmitting data, completing data transfer, or selecting an option to close the data network connection); enable the Wi-Fi connection using the Bluetooth channel (e.g., instruct smart cable storage drum to enable the Wi-Fi connection with respect to the mobile device.

At least some of the information sent to the one or more remote computing devices causes a web browser or an installable software application to display the captured video on the one or more remote computing devices. At least some of the information sent to the one or more remote computing devices causes a web browser or an installable software application to display a user interface for controlling the inspection camera at the one or more remote computing devices. At least some of the information received from the one or more remote computing devices causes at least one operation of the inspection camera to change.

A pipe inspection record and the captured video may be stored on a data storage device of the smart cable storage drum.

A computer-implemented method for controlling an inspection device using a first remote computing device may comprise any or all of: receiving first inspection data from a first cable drum or a first inspection device; displaying at least some of the first inspection data via a web browser or other software application; receiving at least a first input from a user of the remote computing device; creating, based on the first input, an instruction configured to control one or more operations of the first inspection device; and sending the instruction to the first cable drum or the first inspection device; sending the first input to a second remote computing device; receiving data related to a second input from a second user of a second remote computing device; displaying the data related to the second input; receiving second inspection data from a second cable drum or a second inspection device; displaying at least some of the second inspection data via the web browser or other software application; receiving data from a backend database; comparing the data from the backend database with the first inspection data; and displaying, based on the comparing, at least some of the data from the backend database simultaneously with the first inspection data via the web browser or other software application.

The first inspection data may be received via a wireless local area network hosted by the first cable drum or the first inspection device. The first input may include one or more edits to the first inspection data. The first input may include additional data related to the first inspection data. The first inspection data may be received via a wireless network hosted by the first remote computing device. The first inspection data may be received via the Internet. The second inspection data and the first inspection data may be simultaneously displayed.

An apparatus for viewing information from or controlling an inspection device may comprise any or all of: a display configured to present a user interface, wherein the user interface may be configured to receive input from a user that causes a change in an operation of the inspection device; and a processor in communication with the inspection device over a network, said processor operable to: cause the display to present inspection data received from the inspection device in the user interface on the display; and cause an instruction based on the input from the user to be sent to the inspection device.

A computer program product comprising a computer usable medium having a computer readable program code embodied therein, said computer readable program code adapted to be executed to implement a method for viewing information from or controlling an inspection device, where the method may comprise any or all of: receiving inspection data from a cable drum or an inspection device; displaying at least some of the inspection data on a user interface provided by a web browser or other software application; and receiving a plurality of inputs from a user of the remote computing device, wherein a first input modifies the inspection data, a second input creates data associated with the inspection data, and a third input causes a change in an operation of the inspection device.

Variations of Aspects

It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In accordance with certain aspects of the present disclosure, one or more of the process steps described herein may be stored in memory as computer program instructions. These instructions may be executed by a digital signal processor, an analog signal processor, and/or another processor, to perform the methods described herein. Further, the processor(s), the memory, the instructions stored therein, or a combination thereof may serve as a means for performing one or more of the method steps described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the disclosure.

Aspects of the present disclosure are typically carried out in or resident on a computing network. The computing network generally includes computer hardware components such as servers, monitors, I/O devices, network connection devices, as well as other associated hardware. In addition, the aspects and features described below may include one or more application programs configured to receive, convert, process, store, retrieve, transfer and/or export data and other content and information. As an example, these aspects and features may include one or more processors that may be coupled to a memory space comprising SRAM, DRAM, Flash and/or other physical memory devices. Memory space may be configured to store an operating system (OS), one or more application programs, such as a UI program, data associated with the pertinent aspect or feature, applications running on processors in the device, user information, or other data or content. The various aspects and features of the present disclosure may further include one or more User I/O interfaces, such as keypads, touch screen inputs, mice, Bluetooth devices or other I/O devices. In addition, the certain aspects and features may include a cellular or other over the air wireless carrier interface, as well as a network interface that may be configured to communicate via a LAN or wireless LAN (WiLAN), such as a Wi-Fi network. Other interfaces, such as USB or other wired interfaces may also be included.

Data sources may be a hard disk drive for convenience, but this is not required, and one of ordinary skill in the art will recognize that other storage media may be utilized without departing from the scope of the invention. In addition, one of ordinary skill in the art will recognize that the data source which is depicted as a single storage device, may be realized by multiple (e.g., distributed) storage devices. It is further contemplated that the data source may include one or more types of a data sources, including hierarchical data sources, network data sources, relational data sources, non-relational data sources, object-oriented data sources, or another type of data source able to handle various data types (e.g., structured data that fits nicely into fields, rows, and columns, or data from various media sources such as graphics, photographs, audio, and video structured data. For example, the data source 132 may store data in a fixed file format, such as XML, comma separated values, tab separated values, or fixed length fields. Alternatively, the data source may store data in a non-fixed file format (e.g., a NoSQL data source).

As used herein, computer program products comprising computer-readable media including all forms of computer-readable medium except, to the extent that such media is deemed to be non-statutory, transitory propagating signals.

While various embodiments of the present disclosure have been described in detail, it may be apparent to those skilled in the art that the present disclosure can be embodied in various other forms not specifically described herein.

We claim:
1. A video inspection system, comprising:
a smart cable storage drum including:
a housing;
a wheel assembly mechanically coupled to the housing;
a slip ring for coupling electrical signals and/or electrical power;
a WiFi transceiver configured as a WLAN hotspot to which an external tablet or cellphone computing device is wirelessly connected;
a processor for executing computer readable program code stored in a non-transitory memory to generate streaming video data formatted for rendering on a webpage of the external tablet or cellphone computing device through the WLAN hotspot;
a push-cable having a proximal end and a distal end, the push-cable including conductors to transfer signals and power;
an inspection camera for capturing one or more images or video, the inspection camera mechanically and electrically coupled to a distal end of the push cable to provide the captured one or more images or video to the push cable conductors and further to the processor to generate the streaming video data, and to receive electrical power from the push cable;
a protective coil spring positioned around the push cable at the distal end and adjacent to the inspection camera; and
a rechargeable batter removably coupled to a battery dock on the slip ring;

wherein the slip ring is insertable in a cavity formed in at least part of a corresponding hub of the smart cable storage drum and the WiFi transceiver is disposed in the slip ring.

2. The inspection system of claim 1, wherein the smart cable storage drum includes a rotary hub and wherein the WiFi transceiver is disposed in the rotary hub of the storage drum.

3. The system of claim 1, wherein the slip ring is electrically coupled to transfer power from a power source to the WiFi transceiver.

4. The system of claim 3, wherein the WiFi transceiver is disposed in the slip ring.

5. The system of claim 4, wherein the slip ring includes a key pad and wherein the key pad and the wireless transceiver is disposed in a rotating portion of the slip ring.

6. The system of claim 5, wherein the rotary hub includes electronics to compress the image or video data provided from the inspection camera to generate compressed image or video data.

7. The system of claim 6, wherein the compressed image or video data is provided to the WiFi transceiver for transmission to a wirelessly coupled display device.

8. The system of claim 1, further including a USB port disposed in the slip ring.

\* \* \* \* \*